A. H. DEGGINGER.
CARRIER FOR EGGS, FRUIT, AND THE LIKE.
APPLICATION FILED MAY 21, 1921.
1,412,779.
Patented Apr. 11, 1922.
2 SHEETS—SHEET 1.
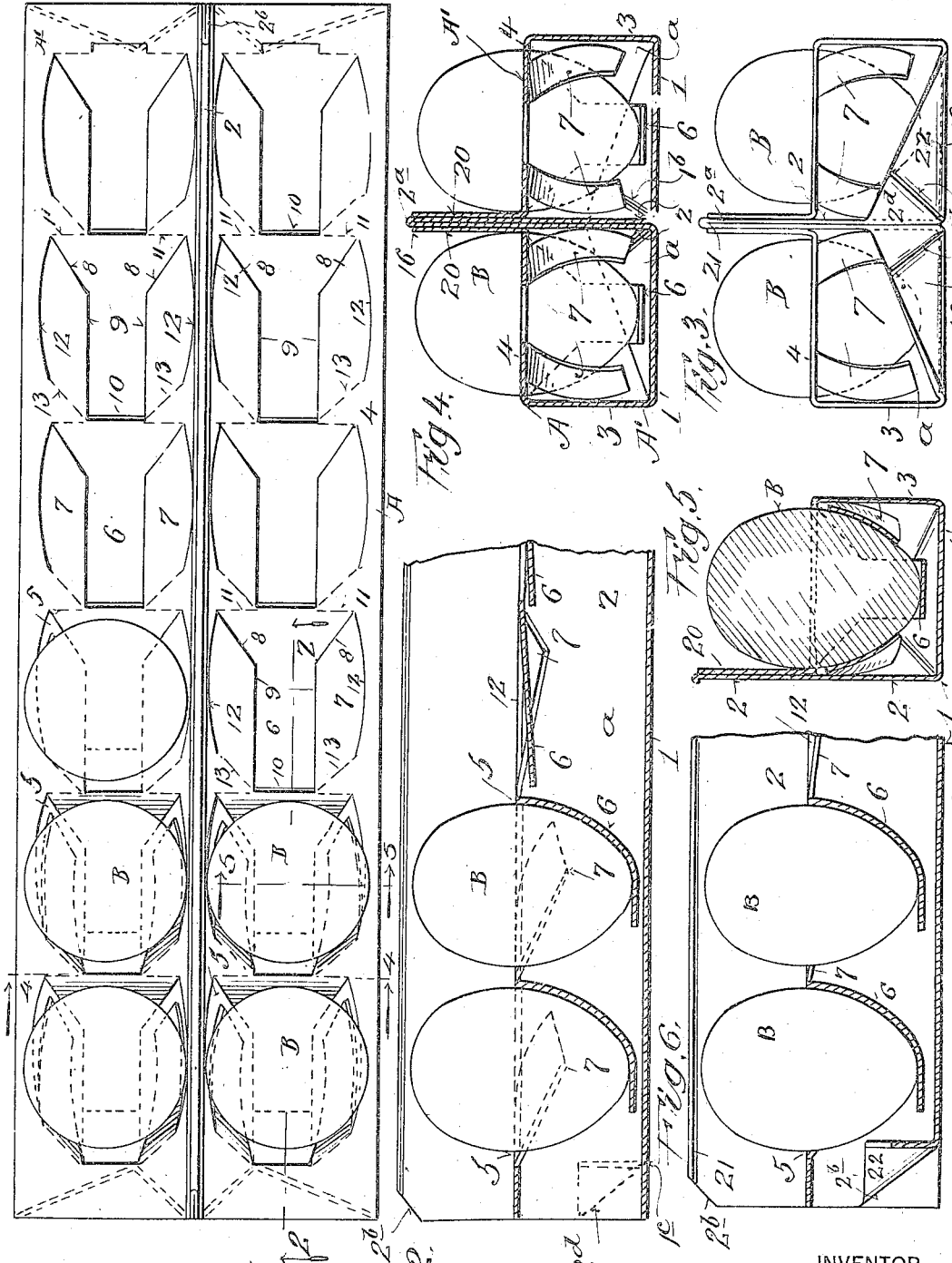
INVENTOR
Agnes Hughes Degginger,
BY HER ATTORNEY
T. F. Bourne A. H. DEGGINGER.
CARRIER FOR EGGS, FRUIT, AND THE LIKE.
APPLICATION FILED MAY 21, 1921.
1,412,779.
Patented Apr. 11, 1922.
2 SHEETS—SHEET 2.
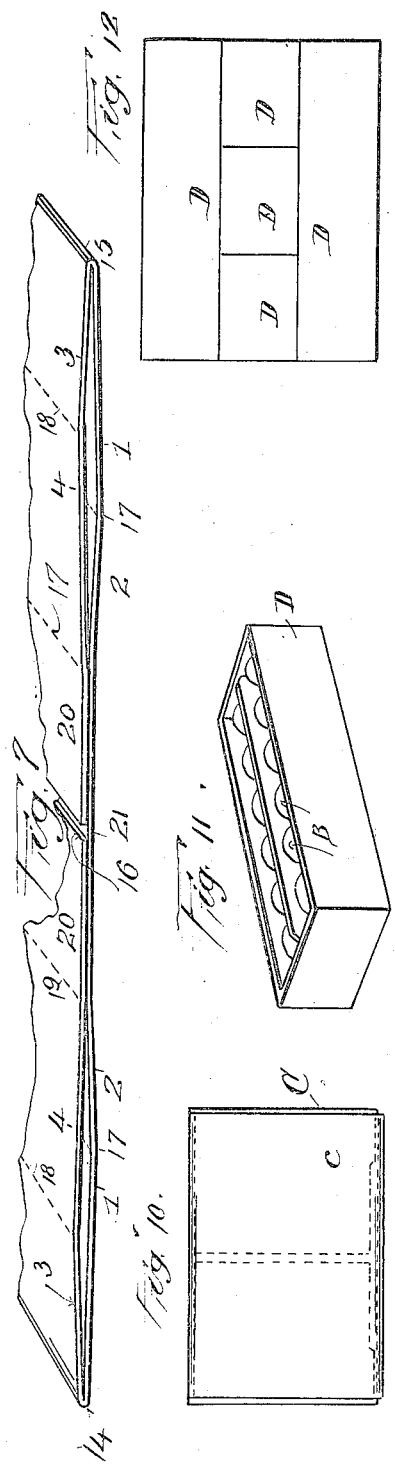
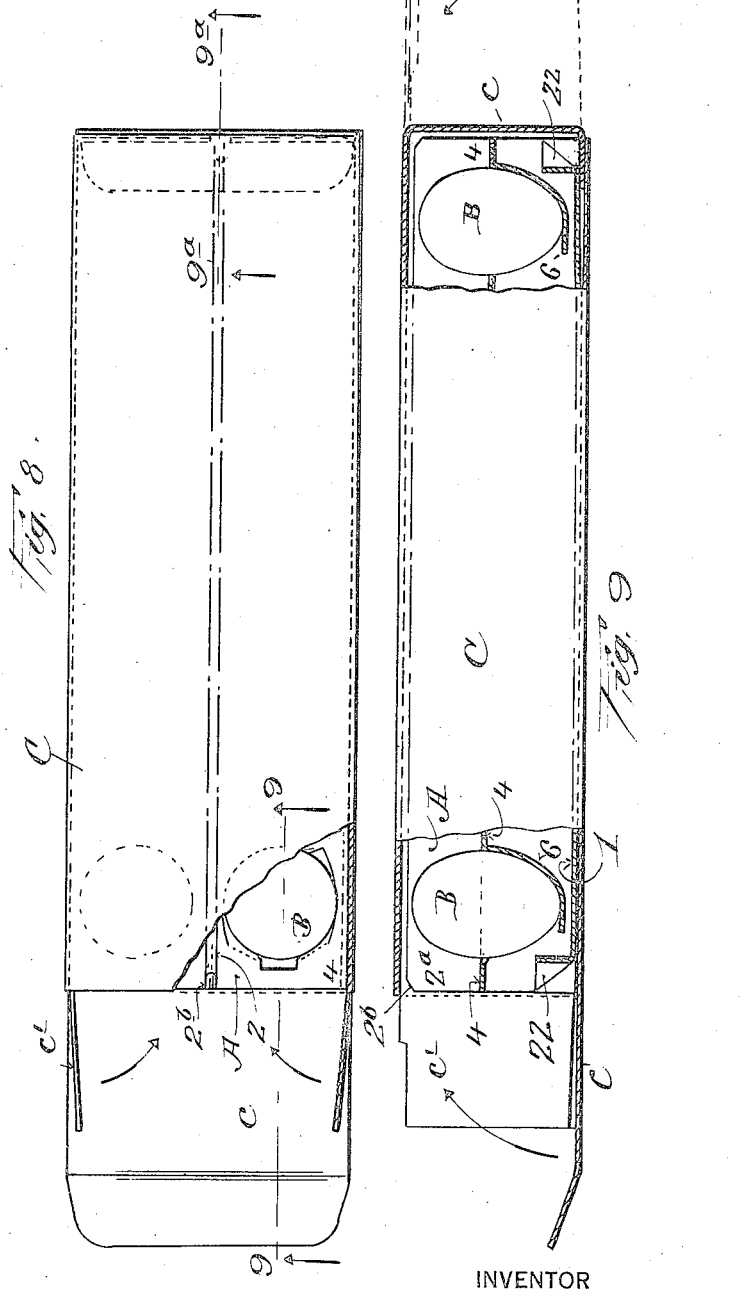
INVENTOR
Agnes Hughes Degginger
BY HER ATTORNEY

UNITED STATES PATENT OFFICE.

AGNES HUGHES DEGGINGER, OF NEW YORK, N. Y.

CARRIER FOR EGGS, FRUIT, AND THE LIKE.

1,412,779.  Specification of Letters Patent.  Patented Apr. 11, 1922.

Application filed May 21, 1921. Serial No. 471,334.

*To all whom it may concern:*

Be it known that I, AGNES HUGHES DEGGINGER, a citizen of the United States, and resident of New York city, borough of Manhattan, in the county of New York and State of New York, have invented certain new and useful Improvements in Carriers for Eggs, Fruit, and the like, of which the following is a specification.

The object of my invention is to provide a carrier for eggs, fruit and analogous articles, whereby the articles may be safely transported in quantity, and the carrier may be used by the retail dealer, in the charged condition received by him, for distribution to the customer. My invention reduces the separate handling of the articles between farmer or wholesaler and the consumer, thereby avoiding losses in handling of the articles and effecting a saving in cost.

My invention comprises novel details of improvement that will be more fully hereinafter stated and then pointed out in the claims.

Reference is to be had to the accompanying drawings forming part hereof, wherein Figure 1 is a plan view of my improved carrier; Fig. 2 is a longitudinal section on line 2, 2 in Fig. 1; Fig. 3 is an end view, looking from the left in Fig. 1; Fig. 4 is a cross section on line 4, 4 in Fig. 1; Fig. 5 is a detail section substantially on line 5, 5 in Fig. 1; Fig. 6 is a detail section; Fig. 7 is an edge view of a blank for making the carrier; Fig. 8 is a partly broken plan view illustrating my carrier within a carton; Fig. 9 is a side view of Fig. 8, partly in section on lines 9, 9 and 9ª, 9ª, in Fig. 8; Fig. 10 is an end view of the charged carton; Fig. 11 illustrates the carrier enclosed for shipment in an egg crate, and Fig. 12 illustrates the goods stacked.

Similar numerals of reference indicate corresponding parts in the several views.

The carrier comprises an elongated member A having a bottom 1, side walls 2, 3, and a top 4, providing an open interior compartment *a* to receive part of the eggs or other articles B. The top 4 is provided with carrier means comprising opening 5, projection 6 and wings 7 for each article B. To produce said opening, projection and wings, the top 4 is severed and scored as follows:— Cuts are made through the material along lines at 8, 8, 9, 9 and 10, leaving the material uncut but scored at 11. Said cuts produce the projection 6 which remains hinged to the main material of the top at the scores 11. The cuts at 9 produce free side edges of projection 6 and also free side edges of wings 7. Cuts at 12 are made in top 4 whereby the wings are formed free from the top and from projection 6, at opposite sides of the latter, and the material of the top is scored at 13 whereby the wings remain hinged to the top. The cuts at 12 and scorings at 11, 13 provide the margin of opening 5. The projection 6 is hinged at one side of opening 5 and the wings 7 are hinged at the opposite side of the opening, so that the projection 6 and wings 7 may be bent inwardly within member A. When article B is inserted in opening 5 it will push inwardly the projection 6 and wings 7, the projection bearing under the article and the wings bearing at the side portions of the articles, (Figs. 2 and 5). The article bears along the edge portions of opening 5 and the projection 6 and wings 7 serve to sustain the article in a resilient manner, in a sort of hammock-like way. The material of the carrier may be of cardboard, whereby the top 4 will be pliable to resiliently support article B.

Any desired number of the openings 5, projections 6 and wings 7 therefor may be formed in series in top 4. I have shown six of the same in a row, and two of such rows side by side, providing a carrier with twelve supports for eggs. The construction is such that the carrier can be made with six egg supports in a row, so that the carrier will fit properly within an ordinary commercial egg crate.

An advantage of my invention is that I am enabled to make the carrier with two similar sections A', side by side, each having a bottom 1, sides 2, 3, top 4, openings 5, projections 6 and wings 7, adapted to carry two rows of eggs or the like. In the form illustrated the adjacent walls 2 of the sections are extended side by side beyond the tops 4, providing a strengthening rib 2ª which may be used in the nature of a handle for lifting the carrier, (Figs. 3 and 4). Said rib is in a plane midway between the outer walls 3 of the carrier with the articles B on opposite sides of the carrier extending into the compartments *a*, the top of the rib being above the tops of said articles.

The carrier may be made by folding a piece of cardboard at 14, 15 (Fig. 7), to make two layers with the inner edges 16 adjacent, and scoring the same longitudinally on opposite sides of said edges at 17, 18, 19, providing for the bottoms 1, sides 2, 3, and tops 4 of the sections A′, and folding the material along the score lines and the folds 15 into rectangular shape, (Figs. 3 and 4). The layers of material between the edges 16 and scoring 19 are preferably glued together to retain the webs 20 adhering to the projecting portions of the sides 2, whereby the tops 4 are supported on the central rib, and the latter is reinforced. Since the sides 2 extend from the bottoms 1 beyond the tops said bottoms are supported when the carrier is lifted by the central rib. An advantage of the construction is that the blank having the carrying portions may be made and shipped in a flat condition (Fig. 7), ready to be formed in the rectangular shape shown when the carrier is to be charged, the inner walls being scored at 21 to fold like a hinge.

My improved carrier is adapted to be enclosed within a carton C for shipment. The carton is shown of rectangular form having end flaps $c$ and side flaps $c'$, the latter being adapted to be folded over the open ends of the carton and the flaps $c$ to be folded over the flaps $c'$ and the ends tucked in the carton. The upper corners of the rib $2^a$ are reduced or cut away at $2^b$ to facilitate tucking of the flap $c$. The outer ends of the bottoms 1 are preferably creased or scored at $1^b$, $1^c$, and the lower ends of the walls 2 are scored at $2^d$, said bottom and wall ends being turned or folded upwardly at 22 to facilitate tucking of flap $c$ within the carton along bottoms 1 of the carriers. The flaps $c$ of the carton are shown extending from opposite walls thereof, hence one flap $c$ may be tucked along rib $2^a$ and the other flap $c$ along bottoms 1 of the carrier. The construction enables a cheap form of carton to be used. My improved carrier may be readily set up for use, charged with the articles B, and slid endwise into the carton, the flaps of which will be closed to retain the carrier. The rib $2^a$ of the carrier not only strengthens the latter but affords a brace within the carton for its lower and upper walls while the sides of the carrier brace the sides of the carton. The cartons as well as the carrier may be shipped flat to be set up as used, cheapening the cost of transportation. The cartons containing the charged carrier provide a safe means for delivery of the goods to the customer, as where the grocer delivers eggs to the latter. An advantage of my carrier is that the latter may be filled by the farmer or wholesaler, enclosed in a pasteboard band D (Fig. 11), and packed in an egg crate ready to be removed as received and placed in the carton after removing the band, thereby reducing the requirement for separately handling the eggs from the crate as is usual with eggs shipped in ordinary crates having strawboard separators. The charged carriers A having the bands D may be packed in the crate in tiers of three carriers each, crosswise disposed, as illustrated in Fig. 12.

My improvements may be used not only for shipping eggs but for fancy fruits and other perishable articles, since each article will be separately and safely supported in its carrier.

The device is simple and cheap to construct, may be readily set up for use, and the carrier as a whole is useful and handy for the customer, the goods having once been packed not needing further separate individual handling until the user removes the articles from the carrier.

Changes may be made in the details set forth without departing from the scope of the claims.

Having now described my invention, what I claim is:—

1. A carrier comprising a bottom, sides and top, the latter having an opening provided with a projection and side wings to engage an article in the opening, said projection extending from one side of the opening and the wings extending from the opposite side of said opening.

2. A carrier having a compartment provided with a top, said top having a series of openings provided with projections and wings adapted to enter the compartment, a wall extending from the bottom of the compartment beyond said top, the outer corners of said wall being reduced.

3. A carrier having a compartment provided with a top, said top having a series of openings provided with projections and wings adapted to enter the compartment, and a wall extending from the bottom of the compartment beyond said top, the ends of said bottoms and wall being folded inwardly.

4. The combination of a carrier having parallel compartments having tops provided with supporting means for articles, and a wall extending beyond said tops in a plane between said compartments, with a carton having an open end to receive said carrier, said wall opposing a wall of the carton to sustain it.

5. The combination of a carrier having parallel compartments having tops provided with supporting means for articles, and a wall extending beyond said tops in a plane between said compartments, with a carton having an open end to receive said carrier, said wall opposing a wall of the carton to sustain it, said carton having an end flap to tuck between a wall of the carton and the carrier therein.

Signed at New York, in the county of New York, and State of New York, this 20th day of May, A. D. 1921.

AGNES HUGHES DEGGINGER.